United States Patent Office 3,097,967
Patented July 16, 1963

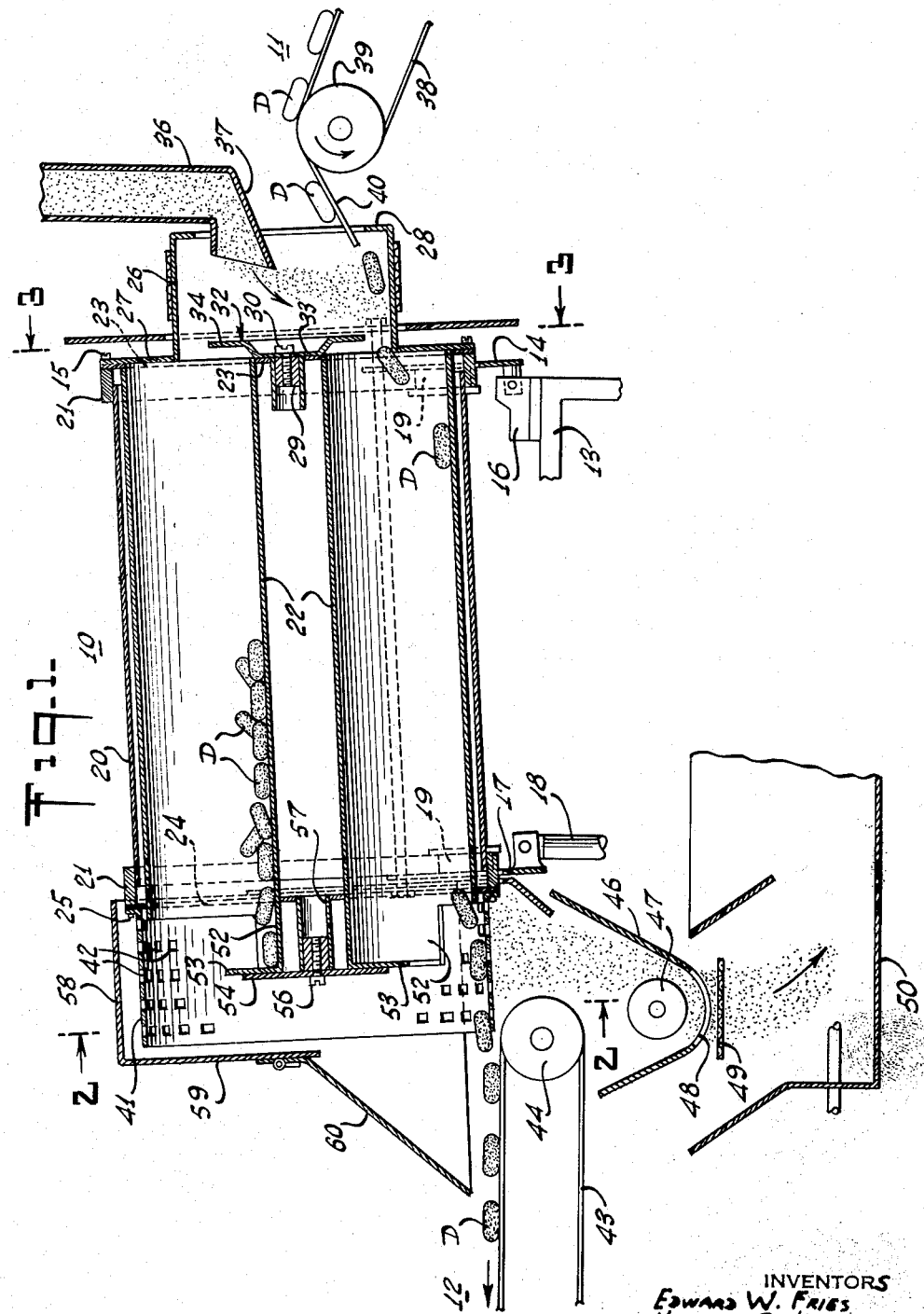

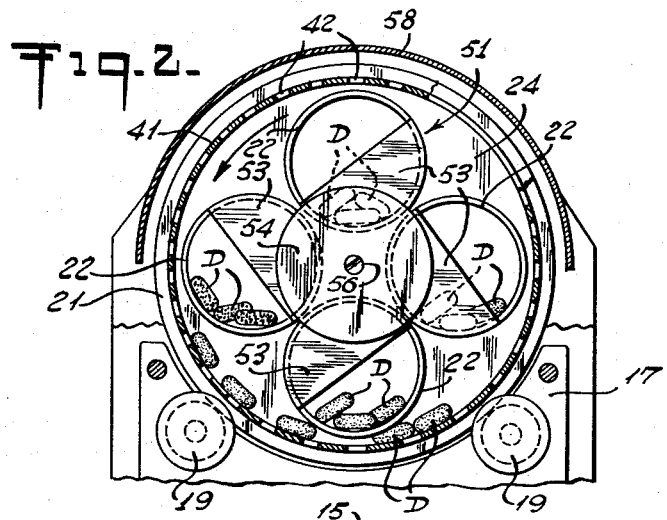
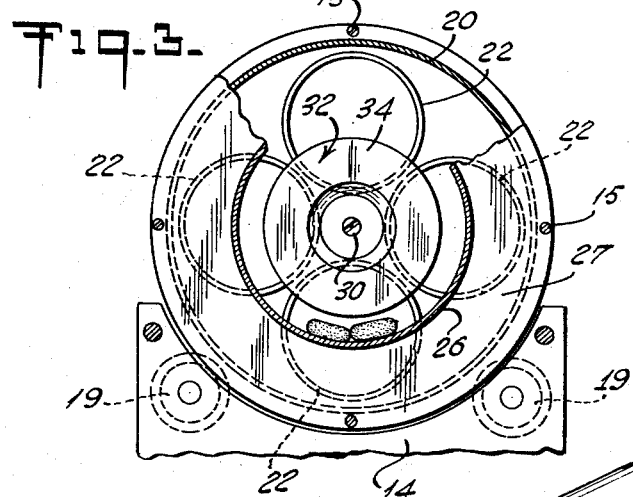
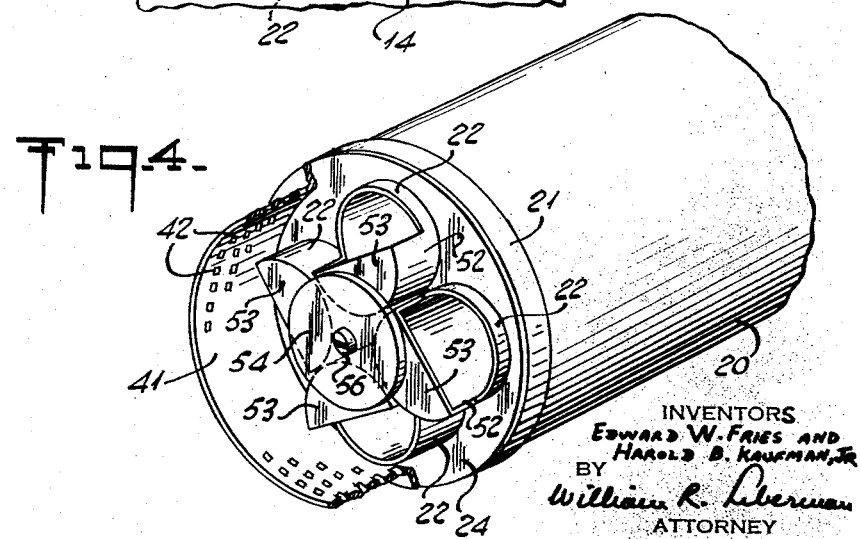

3,097,967
APPARATUS FOR COATING COMESTIBLES
Edward W. Fries, Baltimore, Md., and Harold B. Kaufman, Jr., New York, N.Y., assignors to DCA Food Industries Inc., a corporation of New York
Filed May 16, 1961, Ser. No. 110,409
11 Claims. (Cl. 118—19)

The present invention relates generally to improvements in comestible coating equipment, and it relates particularly to an improved apparatus for the coating of baked products, such as doughnuts, crullers or the like, with pulverant materials, such as the conventional sugar dusting powders.

It is the conventional practice in the coating of doughnuts and similar baked products with sugar dusting powders to tumble the doughnuts and dusting powder in a rotating drum of large diameter while advancing the doughnuts from the feed end through the discharge end of the drum. Any of the free dusting powder which emerges from the discharge end of the drum is returned to and introduced into the free end of the drum and recirculated. The apparatus heretofore employed for applying dusting powders to doughnuts possess numerous drawbacks and disadvantages. The capacity of the conventional doughnut coating machines is small relative to the size and cost of the machine. In addition, the frequency of breakage and damage to the doughnuts being handled by this equipment is high thereby appreciably increasing the cost of the end product and reducing the quality and appearance thereof. It is apparent that the equipment heretofore employed in the powder coating of baked products leaves much to be desired.

It is, therefore, a principal object of the present invention to provide an improved apparatus for the treatment of comestibles.

Another object of the present invention is to provide an improved apparatus for coating doughnuts and other cakes and baked products with granular and pulverant materials, such as, for example, sugar dusting powders.

Still another object of the present invention is to provide an improved cake dusting apparatus of high efficiency and capacity relative to the size of the apparatus.

A further object of the present invention is to provide an improved cake dusting apparatus in which the cakes are handled with a minimum of breakage or damage.

Still a further object of the present invention is to provide an improved cake dusting apparatus of the above nature characterized by its flexibility, versatility, ruggedness and ease of operation, cleaning and maintenance.

The above and other objects of the present invention will become apparent from a reading of the following description, taken in conjunction with the accompanying drawings, wherein:

FIGURE 1 is a longitudinal vertical sectional view of a cake dusting apparatus embodying the present invention, illustrated partially broken away;

FIGURE 2 is a sectional view taken along line 2—2 in FIGURE 1;

FIGURE 3 is a sectional view taken along line 3—3 in FIGURE 1; and

FIGURE 4 is a fragmentary perspective view of the discharge end of the dusting apparatus.

In a sense, the present invention contemplates the provision of a dry coating or dusting apparatus comprising a tunnel member extending longitudinally from a feed end to a discharge end, means rotating said tunnel member about a longitudinal axis transversely offset relative to the longitudinal axis of said tunnel member, and means for delivering cakes and a coating material to said feed end of said tunnel member.

In accordance with a preferred form of the present invention, there is provided a longitudinally extending support structure defining barrel, which is mounted for rotation on a pair of longitudinally spaced sets of wheels. The wheels are carried by a support frame which permits the relative level adjustment of the cradles and, hence, the inclination of the barrel which is downwardly inclined from the trailing or feed end to the leading or discharge end thereof.

Disposed in the barrel and transversely offset relative to the longitudinal axis thereof are a plurality of circumferentially spaced longitudinally extending parallel tubular tunnel members. Mounted on the feed end of the barrel is a rearwardly directed coaxial feed tube rotatable with the barrel and projecting to the tunnel member trailing ends, the leading edge of the feed tube extending across the trailing tunnel member openings. The tunnel feed opening sections adjacent the edges thereof proximate the barrel axis are blocked off, as are the sections radially outside the feed tube. Projecting forwardly of the barrel is a perforated coaxial transfer tube which separates the excess free powder from the cakes, the discharge ends of the tunnel members being provided with forwardly projecting bucket members having transversely directed openings which face upwardly when the respective tunnel member is at the top of its path and downwardly when at the bottom of its path. Means are provided for rotating the barrel and recirculating the dusting powder.

Referring now to the drawings, which illustrate a preferred embodiment of the present invention, which is particularly useful in the application of sugar coatings to doughnuts and the like, reference numeral 10 generally designates the improved apparatus, numeral 11 a doughnut feed conveyor and numeral 12 a doughnut discharge conveyor. Apparatus 10 comprises a support frame 13 having mounted at its trailing end a tiltable cradle 14 pivoted to the support frame 13 by a suitable bracket 16 and at its leading end a cradle 17 pivotally connected to a support jack 18, which is vertically adjustable whereby the relative elevations of the cradles 14 and 17 may be varied. Sets of flanged wheels 19 are rotatably mounted on the confronting faces of the cradles 14 and 17.

A longitudinally extending barrel 20 is provided along its opposite edges with annular track defining collars 21, which rest on the cradle supported wheels 19 whereby to be freely rotatable about the longitudinal axis of the barrel 20. Suitable means, not shown, are provided to effect the rotation of the barrel 20 about its longitudinal axis at any desired angular speed.

Located in the barrel 20 and extending longitudinally for substantially the full length thereof are a plurality of circumferentially spaced tubular tunnel members 22 of circular transverse cross-section. The longitudinal axes of the tunnel members 22 are equidistance from the longitudinal axis of the barrel member 20. Secured to the trailing end of the barrel 20 by means of screws 15 engaging the edge of a respective collar 21 is an end wall 23, and secured to the leading end of the barrel 20 by means of screws 25 engaging the edge of the other collar 21 is an end wall 24, the end walls 23 and 24 having circumferentially arranged aligned circular openings formed therein. The respective tunnel members 22 extend between and register with aligned pairs of said circular openings and are releasably carried by the end walls 23 and 24 whereby to rigidly support the tunnel members 22 within the barrel 20 for rotation therewith.

A feed tube 26 of smaller diameter than the barrel 20 projects rearwardly of the trailing end of the barrel 20 and is coaxial therewith. The front edge of the feed tube 26 lies approximately along a path intersecting the longitudinal axes of the tunnel members 22 and is provided with an outwardly directed peripheral flange 27 which is suitably secured to the trailing edge of the trailing collar 21 by means of the screws 15. The flange 27 closes those sections of the trailing openings of the tunnel members 22 extending radially outwardly from the feed tube 26 and prevents the rearward movement of tunnel members 22. The trailing edge of the feed tube 26 is provided with an inwardly directed lip 28.

An anchoring shank member 29 coaxial with the barrel 20 is affixed to and projects forwardly from the center of the barrel end wall 23 and is provided with a tapped axial bore. Affixed to the shank 29 by means of a screw 30 is an end plate 32 provided with a center cupped section 33 and a rearwardly located peripheral annular border section 34 disposed rearwardly of the leading edge of the feed tube 26 and spaced from the inner face thereof. The peripheral edge of the annular border section 34 defines with the confronting face of the feed tube 26 arcuate adit openings to the respective tunnel members 22 which extend substantially across the middle of each of the tunnel members 22 along a circular path concentric with the longitudinal axis of the barrel 20.

A chute 36 is connected to a suitable source of a powdered dusting or coating material and is provided with a leg 37 discharging into the upper section of the feed tube 26. The comestibles to be coated in the present example, doughnuts D, are transported by an endless conveyor belt 38 extending about a drive drum 39 to an inclined plate 40, which extends from the end run of the conveyor belt 38 into the lower section of the feed tube 26.

Projecting forwardly from the leading end of the barrel 20 and coaxial with and of substantially the same diameter as the barrel 20 is a perforate discharge or transfer tube 41 having a plurality of apertures formed throughout the surface thereof. The tube 41 is provided at its trailing edge with an outwardly directed peripheral flange secured to the collar 21 by the screws 25. Underlying the leading bottom edge of the discharge tube 41 is the trailing portion of an endless conveyor belt 43 extending about a drive drum 44. Located below the level of the trailing end of the conveyor belt 43 and coextensive with the depth and diameter of the discharge tube 41 is a transversely extending trough 46 into which free dusting powder non-adherent to the doughnuts D and passing through the discharge tube apertures 42 fall. Along the base of the trough 46 is disposed a screw conveyor 47 which transports the pulverant powder material falling into the trough 46 to a bottom discharge aperture 48 adjacent the end of the trough below which is disposed a vibrating sieve 49 which screens the pulverant material and drops it into the feed end of a longitudinally extending bin 50. Means, not shown, are provided for transporting the discharged pulverant material along the bin 50 and to the chute 36, where it is recirculated for further coating use. A detailed description of the operation of the pulverant material recirculating and screening system, the support and adjustment of the drum 20, and the driving thereof is given in U.S. Patent No. 2,970,563, granted February 7, 1961, to H. T. Hunter and is incorporated herein by reference.

Each of the tunnel members 22 is provided with a discharge bucket 51 projecting forwardly from the leading edge of the tunnel member 22 to a point approximately midway between the ends of the discharge tube 41. Each of the bucket members 51 includes a semi-cylindrical bottom wall 52 defined by an integral extension of the corresponding section of the respective tunnel member 22, the forward end of the bucket member 51 being defined by a semi-circular wall 53.

As best seen in FIGURES 2 and 4 of the drawing, the openings in the buckets 51 are directed outwardly relative to the longitudinal axis of the barrel 20 and are turned about the axis of the respective tunnel member 22 approximately 30° in the direction of rotation of the barrel member 20 during the operation of the subject apparatus.

The tunnel members 22 and the associated buckets 51 are locked in position by a removable plate 54 abutting the bucket end walls 53 and releasably fastened by a screw 56 engaging a correspondingly tapped axial bore in an anchor member 57 mounted on and coaxial with the end wall 24. A shield member 58 encircles the upper half of the transfer tube 41 and is provided with a front wall 59 carrying a dependent hood 60, the construction of the aforesaid shield and hood being described in the above-identified Hunter patent.

Considering now the operation of the apparatus described above in connection with the sugaring of doughnuts D, barrel 20 is inclined to the horizontal at an angle in accordance with the desired rate of passage of doughnuts D therethrough and is rotated at a speed which would permit the gentle tumbling of the doughnuts as they traverse the respective tunnel members 22. Doughnuts D are delivered by the conveyor belt 38 and by way of the transfer plate 40 to the bottom of the rotating feed tube 26, it being noted that there is a small drop from the plate 40 to the bottom of the tube 26.

Also continuously delivered to the feed tube 26 by way of the chute 36 is a sugar dusting powder or the like. As feed tube 26 rotates with barrel 20, the dusting powder and the doughnuts advance toward the leading end of the feed tube 26 and enter successive tunnel members 22 by way of the adit openings defined by the confronting edge of the plate 34 and the inner face of the tube 26, and drop a short distance to the bottom of the tunnel members 22. As a result, the doughnuts and dusting powder are tumbled within each of tunnel members 22 to effect the uniform coating of the doughnuts, the doughnuts advancing from the trailing end of the tunnel members 22 to the leading ends thereof by reason of the inclination of the tunnel members.

As doughnuts D leave the leading end of the tunnel members, they enter the respective buckets 51. However, when the bucket associated with a respective tunnel member is approaching or is disposed adjacent the upper part of the barrel, the bucket opening is upwardly directed so that the doughnuts are not discharged therefrom. However, as the respective buckets approach the bottom of the barrel, the bucket member openings are directed downwardly whereby to discharge the doughnuts and the dusting powder onto the perforate tube 41. The free dusting powder is there separated from the doughnuts falling into the bin 46 where it is handled and recirculated in the manner earlier set forth. The coated doughnuts D then fall from the bottom of the transfer tube 41 onto the discharge conveyor 43.

The present apparatus has a considerably higher capacity than the conventional apparatus of the same size. Furthermore, the breakage and damage of the coated product is greatly minimized. This is at least partly due to the fact that in no part of the apparatus is the doughnut permitted to fall any great distance. In addition, the subject apparatus is so constructed as to be hygienic and easy to clean and service.

While there has been described and illustrated a preferred embodiment of the present invention, numerous alterations, omissions and additions may be made without departing from the spirit thereof.

We claim:

1. A comestible coating apparatus comprising a plurality of longitudinally extending tunnel members circumferentially spaced about a central longitudinally extending axis and having adit and exit openings at opposite ends thereof, means rotating said tunnel members about said central axis, feed means for introducing comestibles and a coating material through said adit openings into said tunnel members, means adjacent to said exit openings for separating said comestibles and said coating material, and means for recirculating said coating material from said separating means to said adit openings.

2. A comestible coating apparatus comprising a support structure rotatable about a forwardly downwardly inclined longitudinal axis, a plurality of tunnel members carried by said support structure and rotatable therewith, said tunnel members being parallel to and transversely offset relative to said longitudinal axis and having adit and exit openings at opposite ends thereof, feed means for introducing comestibles and a coating material through said adit openings into said tunnel members, means adjacent to said exit openings for separating said comestibles and said coating material, and means for recirculating said coating material from said separating means to said adit openings.

3. A comestible coating apparatus comprising a longitudinally extending forwardly downwardly inclined barrel, means supporting said barrel for rotation about its longitudinal axis, a plurality of tunnel member located in said barrel about said longitudinal axis and rotatable with said barrel and extending along the length thereof and having adit and exit openings at opposite ends thereof, feed means for introducing comestibles and a coating material into one end of said tunnel members through a respective adit opening, means adjacent to said exit openings for separating said comestibles and said coating material, and means for recirculating said coating material from said separating means to said adit openings.

4. A comestible coating apparatus comprising a longitudinally extending forwardly downwardly inclined barrel, means supporting said barrel for rotation about its longitudinal axis, a plurality of tunnel members located in said barrel about said longitudinal axis and rotatable with said barrel and extending along the length thereof and having trailing end openings, a tubular feed member projecting coaxially rearwardly from and rotating with said barrel, the leading edge of said feed member extending across said trailing end openings of said tunnel members, wall closing the portions of said tunnel member trailing end openings disposed radially outwardly of said feed member and a perforate tubular discharge member projecting forwardly from said barrel beyond the leading edges of said tunnel member.

5. An apparatus according to claim 4, including an end wall located at the sections of each of said tunnel member trailing end openings proximate said barrel longitudinal axis, the remote edges of said walls relative to said axis being spaced from the peripheral wall of said feed member to define therewith adits to said tunnel members extending across the ends thereof.

6. An apparatus according to claim 5, wherein said end walls are disposed rearwardly of the leading edge of said feed member.

7. An apparatus according to claim 5, wherein said end walls are defined by a circular plate coaxial with said feed member and said barrel.

8. A comestible coating apparatus comprising a longitudinally extending forwardly downwardly inclined barrel, means supporting said barrel for rotation about its longitudinal axis, a plurality of tunnel members located in said barrel about said longitudinal axis and rotatable with said barrel and extending along the length thereof and having trailing end openings, a tubular feed member projecting coaxially rearwardly from and rotating with said barrel, the leading edge of said feed member extending across said trailing end openings of said tunnel members, walls closing the portions of said tunnel member trailing end openings disposed radially outwardly of said feed member, a tubular discharge member projecting forwardly from said barrel beyond the leading edges of said tunnel members, and means at the leading ends of said tunnel members preventing the discharge of comestibles therefrom when said tunnel members are located at the upper part of said barrel.

9. A comestible coating apparatus comprising a longitudinally extending forwardly downwardly inclined barrel, means supporting said barrel for rotation about its longitudinal axis, a plurality of tunnel member located in said barrel about said longitudinal axis and rotatable with said barrel and extending along the length thereof and having trailing end openings, a tubular feed member projecting coaxially rearwardly from and rotating with said barrel, the leading edge of said feed member extending across said trailing end openings of said tunnel members, walls closing the portions of said tunnel member trailing end openings disposed radially outwardly of said feed member, a tubular discharge member projecting forwardly from said barrel beyond the leading edges of said tunnel members, and a discharge bucket projecting forwardly of and communicating with each of said tunnel members and having openings therein directed radially outwardly relative to said barrel member longitudinal axis.

10. A comestible coating apparatus comprising a longitudinally extending forwardly downwardly inclined barrel, means supporting said barrel for rotation about its longitudinal axis, a plurality of tunnel members located in said barrel about said longitudinal axis and rotatable with said barrel and extending along the length thereof and having trailing end openings, a tubular feed member projecting coaxially rearwardly from and rotating with said barrel, the leading edge of said feed member extending across said trailing end openings of said tunnel members, walls closing the portions of said tunnel member trailing end opening disposed radially outwardly of said feed member, and a discharge bucket projecting forwardly of and communicating with each of said tunnel members and having openings therein directed radially outwardly relative to said barrel member longitudinal axis.

11. An apparatus according to claim 10, wherein the bottom walls of said buckets are of semi-cylindrical configuration and defined by forward projections of the walls of said tunnel members.

References Cited in the file of this patent

UNITED STATES PATENTS

| | | |
|---|---|---|
| 125,360 | Weissenborn | Apr. 2, 1872 |
| 284,983 | Scattergood | Sept. 11, 1883 |
| 413,161 | Beeman | Oct. 22, 1889 |
| 533,303 | Lee | Jan. 29, 1895 |
| 1,621,775 | Gibson | Mar. 22, 1927 |
| 1,794,041 | Stone | Feb. 24, 1931 |
| 2,790,563 | Hunter | Feb. 7, 1961 |